United States Patent
Heath et al.

(10) Patent No.: US 8,857,589 B2
(45) Date of Patent: Oct. 14, 2014

(54) FRICTION DISK MECHANISM FOR BI-DIRECTIONAL OVERRUNNING CLUTCH

(75) Inventors: Kelly P. Heath, Corning, NY (US); James E. Palmer, Elmira Heights, NY (US)

(73) Assignee: The Hilliard Corporation, Elmira, NY (US)

( * ) Notice: Subject to any disclaimer, the term of this patent is extended or adjusted under 35 U.S.C. 154(b) by 358 days.

(21) Appl. No.: 13/305,943

(22) Filed: Nov. 29, 2011

(65) Prior Publication Data

US 2013/0134006 A1    May 30, 2013

(51) Int. Cl.
    *F16D 41/067*    (2006.01)

(52) U.S. Cl.
    USPC .................................. 192/45.006; 192/48.92

(58) Field of Classification Search
    USPC ...... 192/48.92, 35, 38, 41 R, 45.001, 45.004,
    192/45.006
    See application file for complete search history.

(56) References Cited

U.S. PATENT DOCUMENTS

| | | | |
|---|---|---|---|
| 3,283,611 A * | 11/1966 | Weismann et al. | 74/650 |
| 3,732,750 A * | 5/1973 | Posh | 74/650 |
| 3,935,754 A | 2/1976 | Comollo | |
| 6,622,837 B2 | 9/2003 | Ochab et al. | |
| 6,629,590 B2 | 10/2003 | Ochab et al. | |
| 6,722,484 B2 | 4/2004 | Ochab et al. | |
| 7,410,042 B2 * | 8/2008 | Ochab et al. | 192/48.92 |
| 2006/0213742 A1 | 9/2006 | Irikura et al. | |
| 2008/0190240 A1 | 8/2008 | Dissett et al. | |
| 2008/0283351 A1 | 11/2008 | Sasaki et al. | |
| 2012/0152686 A1 * | 6/2012 | Brewer et al. | 192/84.1 |
| 2013/0112520 A1 * | 5/2013 | Heath et al. | 192/44 |
| 2013/0199886 A1 * | 8/2013 | Heath et al. | 192/104 R |

* cited by examiner

*Primary Examiner* — Jacob S Scott
(74) *Attorney, Agent, or Firm* — Drinker Biddle & Reath LLP

(57) ABSTRACT

A bi-directional overrunning clutch includes a housing and first and second hubs substantially coaxially aligned within the housing. A roll cage positions a plurality of rollers in an annular space between each of the hubs and an inner cam surface of the housing. The rollers are adapted to wedgingly engage between the hub and the inner cam for transmitting torque therebetween. End caps are attached to the housing adjacent to the hubs. A friction disk mechanism located on each side of the roll cage includes a roll cage plate attached to the roll cage, an inner hub friction member attached to the hub, a slip disk, and a spring compressed between the slip disk and the inner hub friction member biasing the inner hub friction member into frictional contact with the roll cage plate.

17 Claims, 7 Drawing Sheets

FRICTION DISK MECHANISM FOR BI-DIRECTIONAL OVERRUNNING CLUTCH

FIELD OF THE INVENTION

The invention relates to a clutch system, and in particular a friction disk arrangement for a bi-directional overrunning clutch for use on a primary drive axle.

BACKGROUND

Bi-directional overrunning clutches are known in which a pair of substantially coaxial hubs are positioned in a housing that is driven by an external drive mechanism. Each hub is adapted to drive a segment of a drive shaft of a wheeled vehicle, one hub driving a left wheel and the other hub driving a right wheel. A plurality of rollers are positioned in an annular space between an internal cam surface of the housing and an outer surface of each of the hubs by a roll cage, each roller being located in a slot in the roll cage, such that wedging engagement of the rollers between the hubs and the cam surface enables the transfer of torque from the housing to the hubs or from one or both of the hubs to the housing.

To facilitate wedging engagement of the rollers when the housing rotates relative to the hubs, it is preferable to index the rollers with respect to the hub. Indexing can be accomplished by creating a frictional interface between a portion of the roll cage and each of the hubs. In an exemplary operation in which the wheeled vehicle starts moving from a stopped condition, the frictional interface causes the roll cage to remain stationary with the hubs when the housing begins to rotate, enabling the rollers to contact the inner cam surface of the housing and wedge between the inner cam surface and the outer surfaces of the hubs.

During deceleration, a similar action can be used to enable regenerative braking, whereby the housing decelerates before the hub and the frictional interface between the roll cage and the hubs causes the roll cage to travel along with the hubs, such that the rollers contact and wedgingly engage between the inner cam surface and the hubs. This same occurrence can happen on a gas or diesel utility vehicle that has EBA (engine braking ability). Consequently, energy dissipated by slowing down the vehicle can be absorbed by the external drive mechanism. However, as a result of drive systems, and specifically differentials, that are typically used with existing clutches, regenerative braking can cause the rollers to shift rapidly back and forth between forward and reverse cam surfaces in the housing, resulting in the driver experiencing a shaking sensation when decelerating, particularly in a turn.

In existing overrunning clutches, the frictional interface often requires a spring to urge two members into frictional engagement, the two members typically including a first member that rotates with the roll cage and a second member that rotates with one of the hubs. However, since the spring may be positioned in contact with an end cap of the housing of the clutch, an undesired frictional interface can be created between the end cap, which rotates at the same speed as the housing, and the spring, which typically rotates with the hub and therefore may be rotating at a different speed than the end cap. The frictional interface between the spring and the end cap may have several undesirable consequences, including accelerated wear which may reduce spring force.

In some clutch designs, the spring is a coil or wound spring, with a left-wound coil spring being used on one side of the clutch and a right-wound coil spring being used on the other side of the clutch, so that the springs do not unwind when the vehicle is in a turn. In these clutches, it is particularly important to reduce or eliminate the frictional interface between the spring and the end cap to ensure proper operation of the clutch. Additionally, it is desirable to replace the left-wound and right-wound springs with a different type of spring to eliminate entirely the risk of unwinding.

SUMMARY

A bi-directional overrunning clutch for driving two shafts of an axle is disclosed having a housing and a pair of hubs substantially coaxially aligned with each other within the housing. The housing is adapted to be engaged with and rotated by a drive mechanism and includes an inner cam surface. The pair of hubs includes a first hub adapted to engage an end of a first shaft of a drive axle and a second hub adapted to engage an end of a second shaft of the drive axle. A roller assembly includes a roll cage having a first set of slots positioning a set of rollers in an annular space between the first hub and the inner cam surface of the housing and a second set of slots positioning a set of rollers in an annular space between the second hub and the inner cam surface of the housing. The rollers surrounding each hub are adapted to wedgingly engage between the hub and the inner cam surface for transmitting torque therebetween. End cap assemblies are attached at each end of the housing so as to rotate with the housing, including a first end cap adjacent to the first hub and a second end cap adjacent to the second hub. A pair of friction disk mechanisms, including a first friction disk mechanism in contact with the roll cage and the first hub and a second friction disk mechanism in contact with the roll cage and the second hub, are adapted to urge the roll cage to rotate with one or both of the hubs. Each friction disk mechanism includes a roll cage plate attached to the roll cage so as to rotate with the roll cage, an inner hub friction member attached to the hub so as to rotate with the hub, a slip disk contacting a portion of the end cap assembly, and a spring compressed between the slip disk and the inner hub friction member biasing the inner hub friction member into frictional contact with the roll cage plate. The slip disk includes a surface with a low coefficient of friction, such as a Teflon surface coating, to reduce torsional loading on the spring and wear on the mating cover surface. The inner cam surface has a forward cam surface and a reverse cam surface, such that when the housing is rotating faster than the hub, the rollers wedgingly engage between the forward cam surface and the hub, and when the hubs are both rotating faster than the housing, the rollers wedgingly engage between the reverse cam surface and the hub.

In one embodiment of a bi-directional overrunning clutch, each end cap assembly includes an end cap attached to the housing and a friction clutch mechanism including at least one drive plate attached to the end cap so as to rotate with the end cap, an outer hub friction member attached to the hub so as to rotate with the hub, a retainer attached to the end cap in an axially fixed position, and a spring, such as a bellville spring, or a dished spring, compressed between the retainer and the at least one drive plate biasing the at least one drive plate into frictional contact with the outer hub friction member. Although a bellville or dished spring is disclosed, other springs can be used in the clutch. The friction clutch mechanism is adapted to urge the housing to rotate with one or both of the hubs when one or both of the hubs is rotating faster than the housing so as to dampen the wedging engagement of the rollers between the hub and the reverse cam surface.

Another bi-directional overrunning clutch for driving two shafts of an axle is disclosed including a housing and first and second hubs substantially coaxially aligned with each other within the housing. The housing is adapted to be engaged with and rotated by a drive mechanism. A roll cage has a first set of slots positioning a set of rollers in an annular space between the first hub and an inner cam surface of the housing and a second set of slots positioning a set of rollers in an annular space between the second hub and the inner cam surface of the housing. The rollers surrounding each hub are adapted to wedgingly engage between the hub and the inner cam surface for transmitting torque therebetween. A first end cap is attached to the housing adjacent to the first hub and a second end cap is attached to the housing adjacent to the second hub. A friction disk mechanism is located on each side of the roll cage including a roll cage plate attached to the roll cage so as to rotate with the roll cage, an inner hub friction member attached to the hub so as to rotate with the hub, a slip disk, and a spring compressed between the slip disk and the inner hub friction member biasing the inner hub friction member into frictional contact with the roll cage plate. The friction disk mechanisms are adapted to urge the roll cage to rotate with one or both of the hubs. The slip disk is attached to the hub to prevent torsional loading on the spring.

In one embodiment of the overrunning clutch, each end cap includes a pair of drive plates attached to the end cap so as to rotate with the end cap, an outer hub friction member positioned axially between the drive plates and attached to the hub so as to rotate with the hub, a retainer attached to the end cap in an axially fixed position, and a spring compressed between the retainer and one of the drive plates biasing the drive plates into frictional contact with the outer hub friction member.

A friction disk mechanism is disclosed for use in a bi-directional overrunning clutch having: a housing adapted to be engaged with and rotated by a drive mechanism, the housing having an inner cam surface; a first hub and a second hub substantially coaxially aligned with each other within the housing; a roll cage having a first set of slots positioning a set of rollers in an annular space between the first hub and the inner cam surface of the housing and a second set of slots positioning a set of rollers in an annular space between the second hub and the inner cam surface of the housing, the rollers surrounding each hub being adapted to wedgingly engage between the hub and the inner cam surface when one of the hubs and the housing is rotated with respect to the other of the hubs and the housing; and a first end cap attached to the housing adjacent to the first hub and a second end cap attached to the housing adjacent to the second hub. A friction disk mechanism is located on each side of the roll cage and includes a roll cage plate attached to the roll cage so as to rotate with the roll cage, an inner hub friction member attached to the hub so as to rotate with the hub, a slip disk, and a spring compressed between the slip disk and the inner hub friction member for biasing the inner hub friction member into frictional contact with the roll cage plate, the slip disk includes or is made with a surface with a low coefficient of friction. The slip disk is physically attached to the hub. As such, the slip disk prevents torsional loading on the spring. Each friction disk mechanism is adapted to urge the roll cage to rotate with one of the hubs.

In one embodiment, the friction disk mechanism also includes a pair of drive plates attached to each end cap so as to rotate with the end cap, an outer hub friction member positioned axially between the drive plates and attached to the hub so as to rotate with the hub, a retainer attached to the end cap in an axially fixed position, and a spring compressed between the retainer and one of the drive plates biasing the drive plates into frictional contact with the outer hub friction member. The frictional engagement between the drive plates and the outer hub friction member is adapted to urge the housing to rotate with one or both of the hubs when one or both of the hubs is rotating faster than the housing so as to dampen the wedging engagement of the rollers between the hub and the reverse cam surface.

BRIEF DESCRIPTION OF DRAWINGS

For the purpose of illustrating the invention, there are shown in the drawings embodiments that are presently preferred; it being understood, however, that this invention is not limited to the precise arrangements and constructions particularly shown.

DETAILED DESCRIPTION

Figure 1:
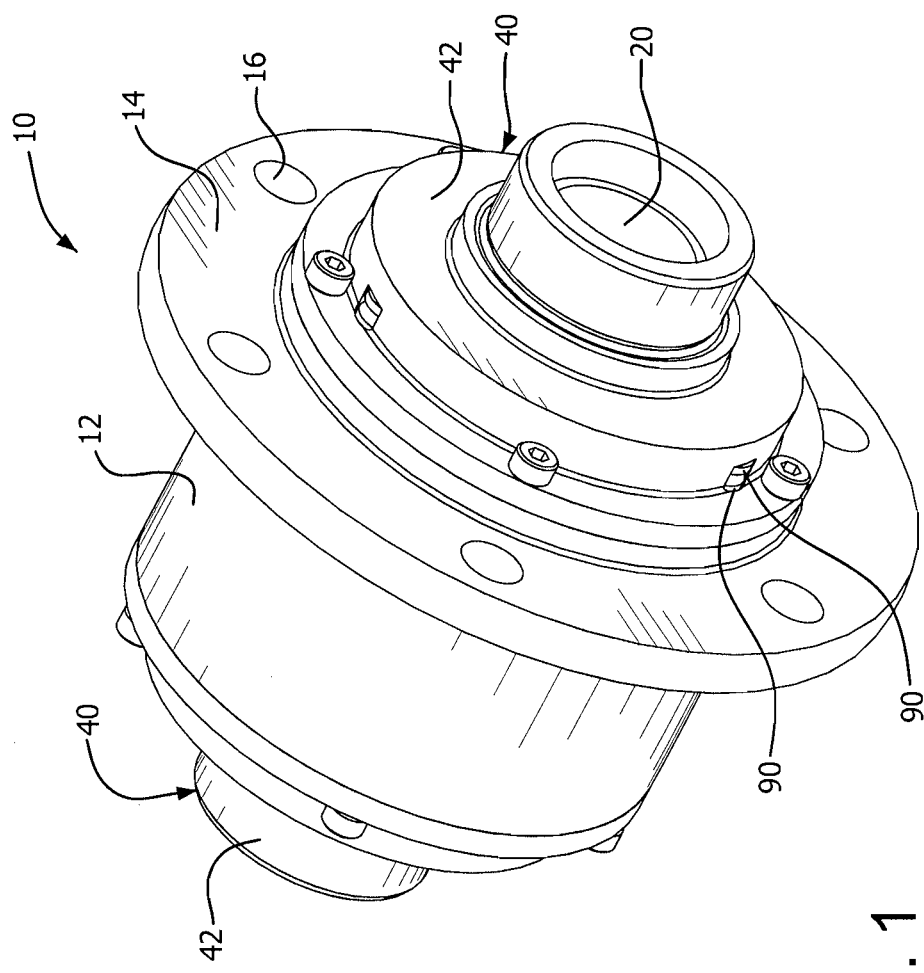
FIG. 1 is a perspective view showing an assembled bi-directional overrunning clutch.

A bi-directional overrunning clutch 10 is shown in FIG. 1. The clutch 10 includes a housing 12 and a flange 14 affixed to the housing 12. The flange 14 is adapted to be joined to an input gear (not shown) that is engaged with an external drive mechanism that imparts rotational movement to the gear. The external drive mechanism may include an electric or gas powered motor. As depicted, the flange 14 includes bolt holes 16 for attaching the gear, it being understood that the gear may be attached to the flange 14 by any mechanical method known in the art or may be formed integral with it. When the drive mechanism rotates the gear, the flange 14 rotates, which in turn rotates the housing 12.

Figure 4:
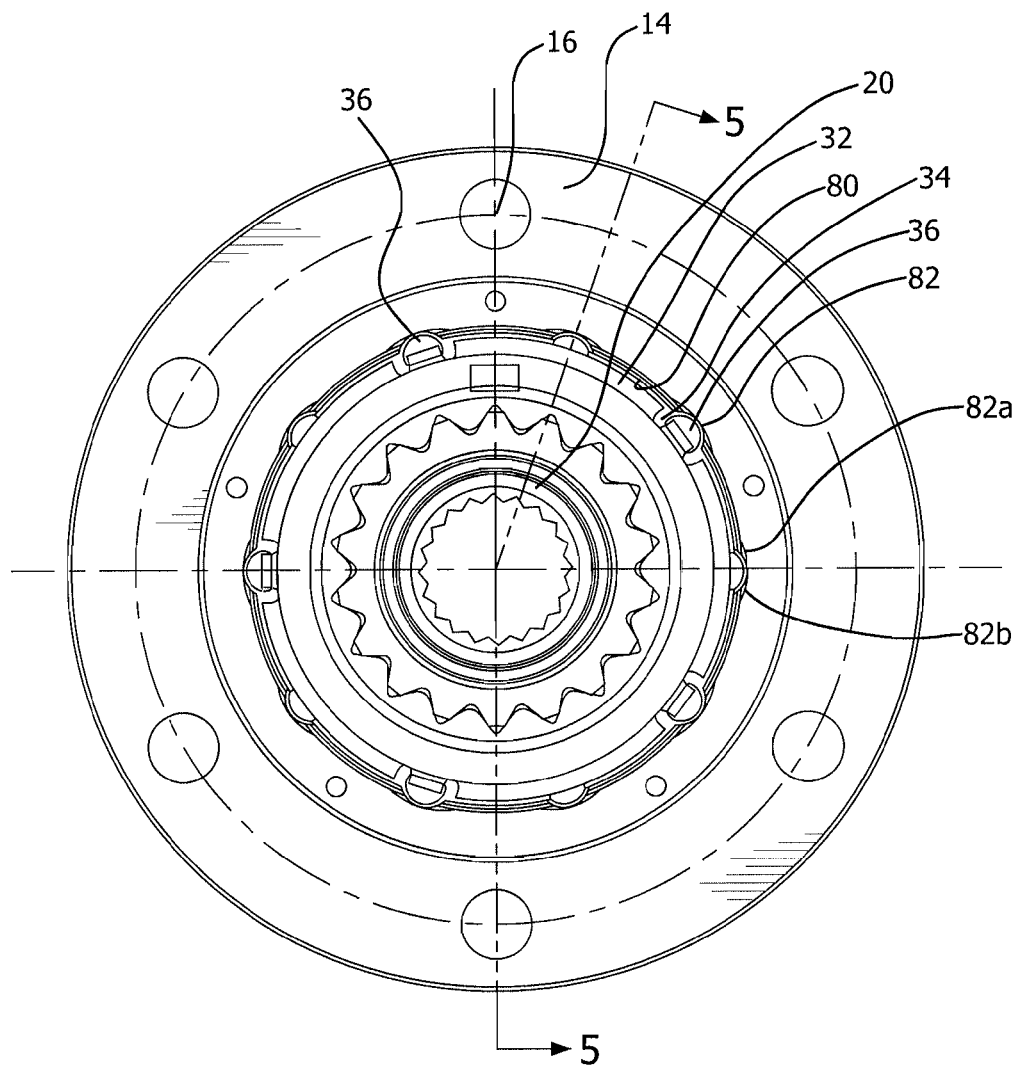
FIG. 4 is an end view of the clutch of FIG. 3 with the end cap removed.

As shown in FIG. 4, the housing 12 includes a substantially cylindrical inner surface 80. The inner surface 80 includes a plurality of inner cam surfaces 82 including forward and reverse cam surfaces 82a, 82b. Depending on the desired direction of rotation of the housing 12, either surface 82a, 82b may be interchangeably considered as a forward or a reverse cam surface.

Figure 2:
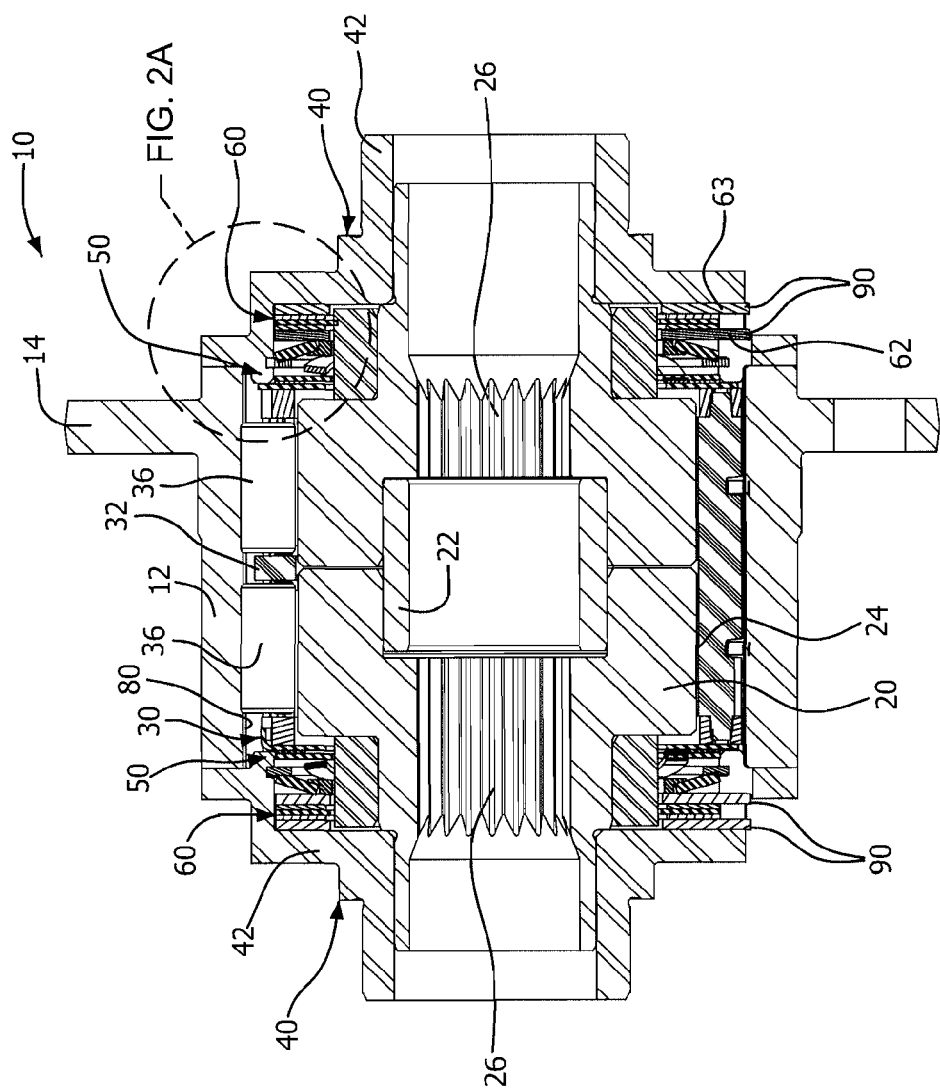
FIG. 2 is a cross-sectional view of the clutch of FIG. 1.

As shown in FIGS. 2 and 4, a pair of hubs 20 are located within the housing 12. The hubs 20 are substantially coaxially aligned with each other within the housing 12, and are each adapted to rotate about their common axis within the housing 12. The hubs 20 include a first hub 20 adapted to engage an end of a first shaft of a drive axle (not shown) and a second hub 20 adapted to engage an end of a second shaft of the drive axle (not shown). Each hub 20 has a substantially cylindrical outer surface 24 having a diameter that is smaller than the diameter of the inner surface 80 of the housing 12, so that an annular space is formed between the outer surface 24 of the hubs and the inner surface 80 of the housing 12. Each hub 20 has an internal bore 26 into which a portion of a primary output drive axle shaft is received. In the depicted embodiment, the internal bores 26 include splines to allow the shafts to move axially inward and outward with respect to the hubs 20 while ensuring that each shaft will rotate along with its respective hub 20. In other embodiments, other mechanical connections between each shaft and its respective hub 20 may be used to ensure rotational coupling. For example, the hubs 20 may be formed integral with the shafts of the drive axles.

Figure 3:
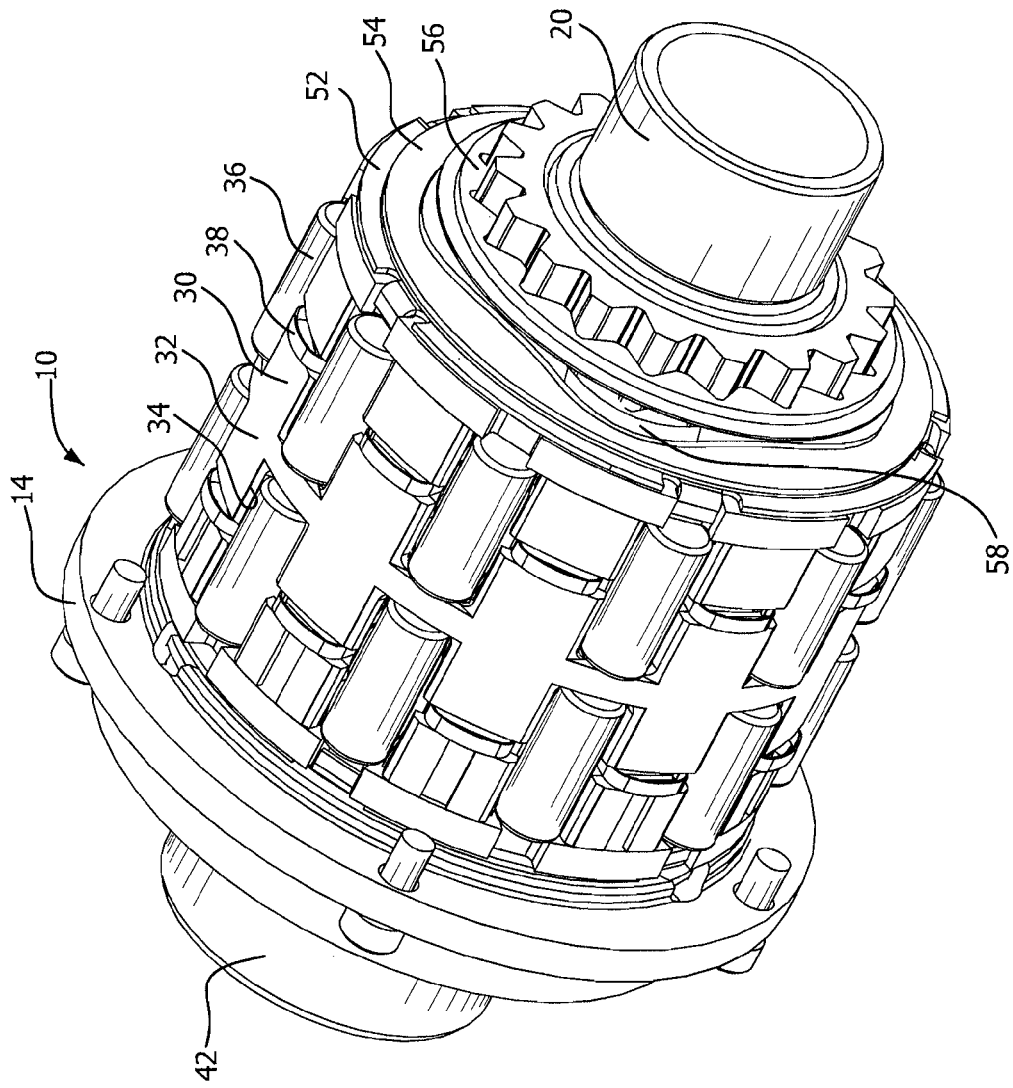
FIG. 3 is a perspective view showing a partially assembled bi-directional overrunning clutch with the housing removed.
Figure 5:
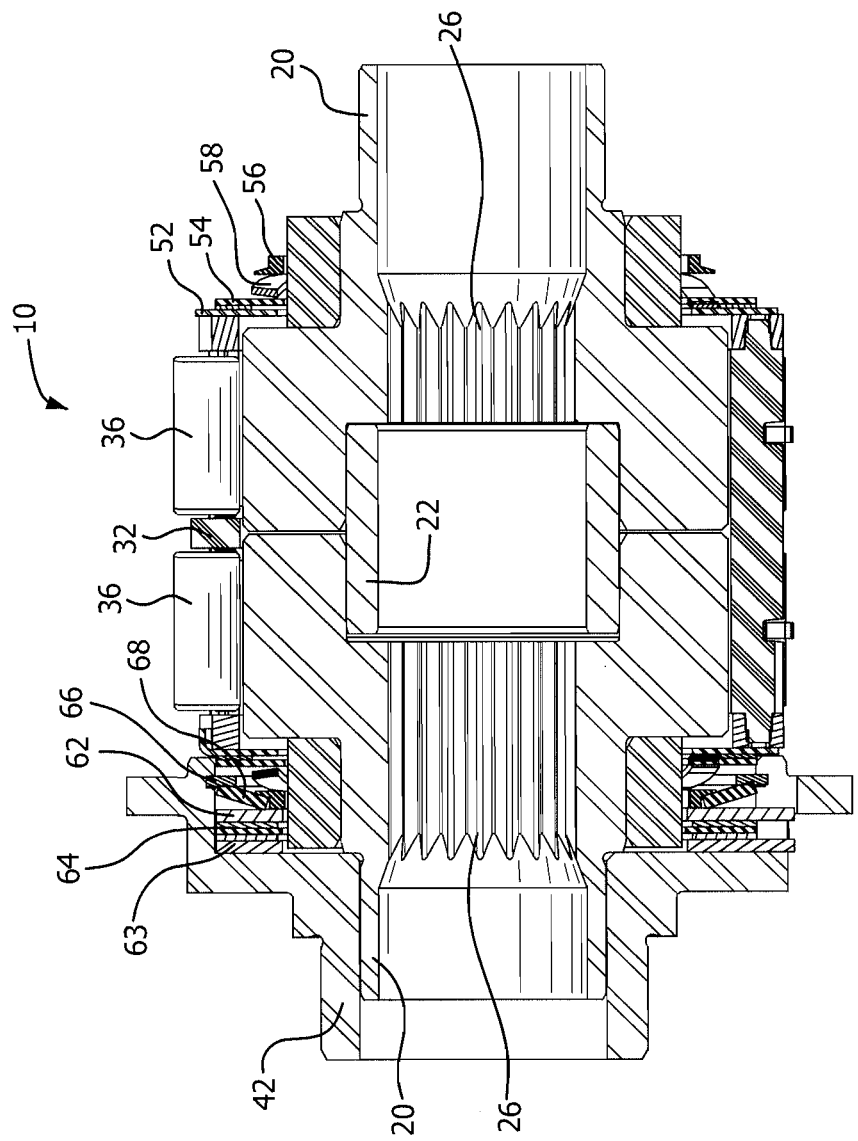
FIG. 5 is a cross-sectional view of the clutch of FIG. 3 through section 5-5 in FIG. 4.

A roller assembly 30 is located within the housing 12, with a portion of the roller assembly 30 being situated in the annular space between the outer surface 24 of the hubs 20 and the inner surface 80 of the housing 12. As shown in detail in FIGS. 3 and 5, the roller assembly 30 includes a roll cage 32 formed in a substantially cylindrical shape. The roll cage 32 has two sets of slots 34 spaced around the circumference of the roll cage 32, each slot 34 being adapted to receive a cylindrical roll or roller 36. A first set of slots 34 positions a plurality of rollers 36 in the annular space 84 between one of the hubs 20 and the inner cam surface 82 of the housing 12, and a second set of slots 34 positions a plurality of rollers 36 in the annular space 84 between the other of the hubs 20 and the inner cam surface 82 of the housing 12. In one embodiment, each set of rollers 36 has ten rollers, it being understood that any number of rollers greater than or equal to three may be used. Spring clips 38 may be provided to position the rollers 36 in the slots 34. Exemplary spring clips are described in U.S. Pat. No. 6,629,590, which is incorporated herein by reference in its entirety. As shown, each roller 36 is substantially cylindrical, but rollers of other shapes may be used, including but not limited to substantially spherical rollers and barrel-shaped rollers in which the center has a larger diameter than the ends.

The rollers 36 surrounding each hub 20 are adapted to be wedgingly engaged between the hub 20 and the inner cam surface 82 of the housing 12 when one of the hub 20 and the housing 12 is rotated with respect to the other. In particular, when the housing 12 is rotationally driven by an external drive mechanism at a speed faster than the hubs 20 are rotating, the rollers 36 wedgingly engage forward cam surfaces 82a in the housing and the outer surfaces 24 of the hubs 20, causing the hubs 20 to rotate with the housing 12. In contrast, when one or both of the hubs 20 are rotating faster than the housing 12, the rollers 36 wedgingly engage the reverse cam surface 82b and the one or both of the hubs 20. The reverse cam surface engagement enables engine braking whereby the reduced speed of the input gear slows or brakes the axles. In a system driven by an electric motor, the reverse cam surface engagement enables regenerative braking, whereby energy dissipated in slowing a vehicle down can be used to rotate an electric motor that is part of the external drive mechanism, and the electric motor in turn generates electricity that is stored in a battery.

Providing two sets of rollers 36 within the roll cage 32 allows overrunning of one or the other hub 20. For example, in a wheeled vehicle in which each hub 20 drives a wheel on an opposite side of the vehicle, when the vehicle travels around a curve, the wheel on the inside of the curve has a shorter distance to travel, and thus travels at a slower speed, than the wheel on the outside of the turn. Consequently, when the housing 12 is being rotationally driven while the vehicle is in a turn, the non-overrunning hub 20 associated with the inside wheel will continue to be driven, with its respective rollers 36 engaged between the outer surface 24 of the non-overrunning hub 20 and the forward cam surfaces 82a of the inner surface 80 of the housing 12, while the overrunning hub 20 associated with the outside wheel will be allowed to overrun, turning faster than the housing 12, such that its respective rollers 36 disengage from the inner cam surfaces 82 and allow the overrunning hub 20 to freely rotate as driven by the outer wheel. When the vehicle returns to a straight path and the housing 12 is being rotationally driven, the rollers 36 surrounding the formerly overrunning hub 20 reengage the forward cam surfaces 82a so that both hubs 20 are once again driven to rotate at the same speed as the housing 12.

An end cap assembly 40 is attached to each end of the housing 12 so as to rotate with the housing 12. Each assembly 40 includes an end cap 42 adjacent to the hub 20. The end caps 42 retain the respective hubs 20 within the housing, and are attached to the housing 12 so as to rotate with the housing 12.

Figure 2A:
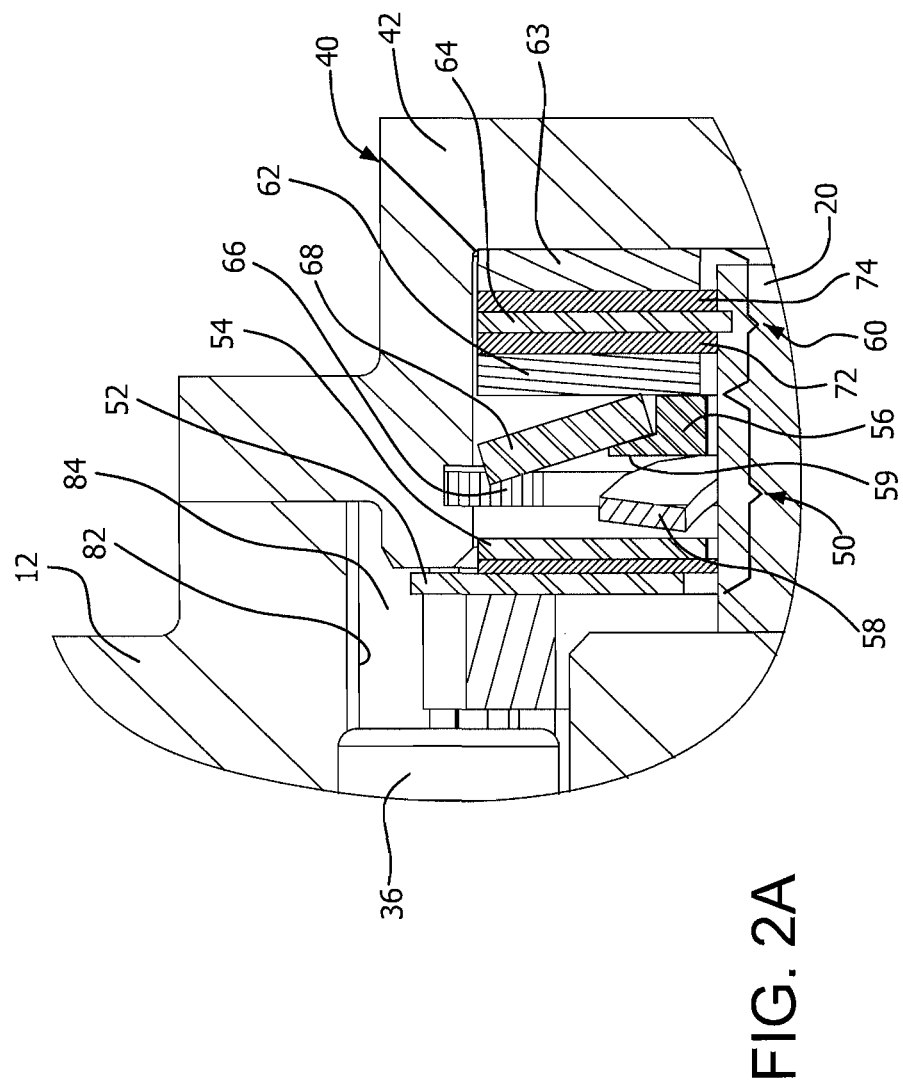
FIG. 2A is partial expanded view of a portion of the clutch of FIG. 2
Figure 6:
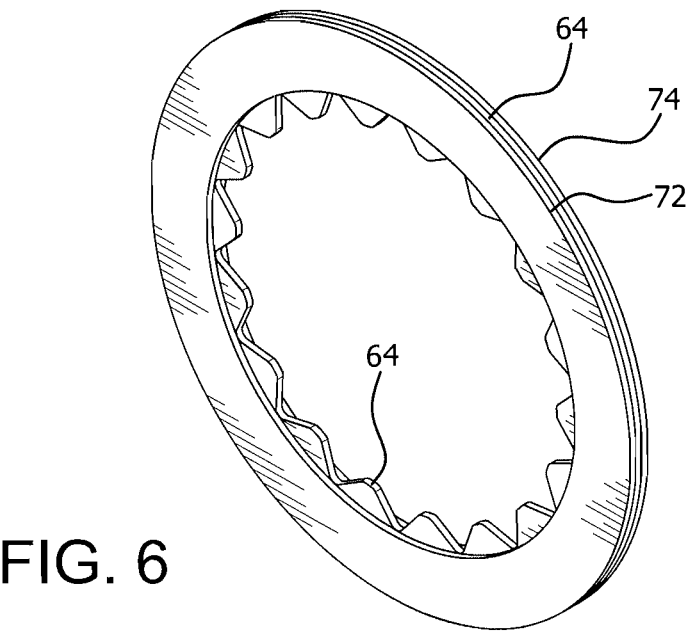
FIG. 6 is an isometric view of an outer hub friction member or disk according to the present invention.
Figure 7:
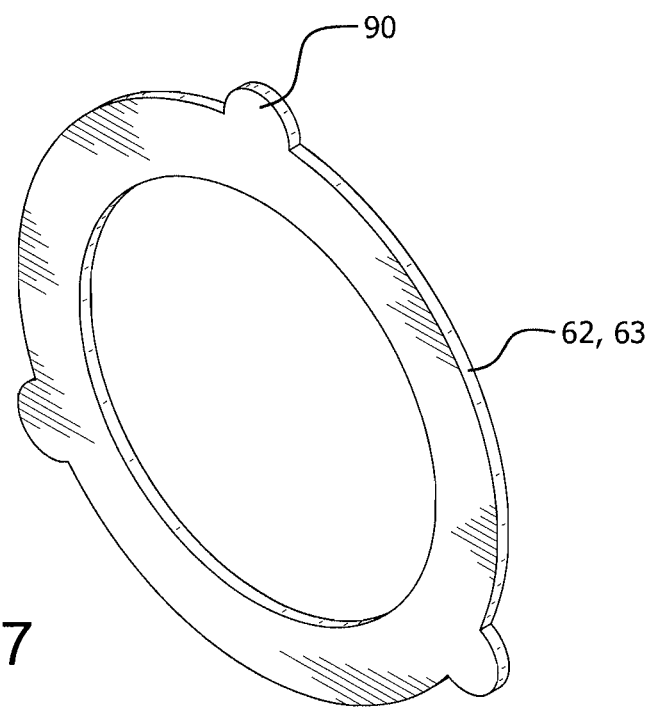
FIG. 7 is an isometric view of a drive plate according to the present invention.

Each end cap assembly 40 preferably includes a friction clutch mechanism 60, shown in detail in FIG. 2A, which is preferably a clutch pack assembly. The friction clutch mechanism 60 has at least one end cap drive plate (cap clutch plate) 62 attached to the end cap 42 so as to rotate with the end cap 42, and an outer hub friction member (hub clutch plate) 64 attached to the hub 20 so as to rotate with the hub 20. For example, the at least one drive plate 62 can be connected by tabs to the end cap 42 that engage with the end cap 42, while the outer hub friction member 64 can be connected by a splined connection to the hub 20. In the depicted embodiment of FIGS. 2, 2a, and 5, the friction clutch mechanism 60 includes a pair of end cap drive plates 62, 63 arranged on either side of the outer hub friction member 64 such that the end cap drive plates 62, 63 sandwich the outer hub friction member 64. The drive plates 62, 63 preferably include radially projecting tabs 90 (shown in FIG. 7) that engage with notched opening formed in the end cap 42. See FIGS. 1 and 2. As such, the drive plates are fixed to the end cap 42. The friction member 64 preferably includes frictional surfaces 72, 74 on or attached to the faces of the plate. The surfaces 72, 74 can be any conventional friction material. FIG. 6 illustrates one embodiment of the friction member 64.

A retainer 66 is attached to the end cap 42 in an axially fixed position to provide backing for a spring 68 that is located between the retainer 66 and the drive plate 62. The spring 68 is compressed between the retainer 66 and the drive plate 62, thereby urging the drive plates 62, 63 into frictional contact with the outer hub friction member 64. Because the drive plate 62 can move slightly axially with respect to the end cap 42, the outer hub friction member 64 and the drive plates 62, 63 can be in tighter or looser frictional contact depending on the amount of compression of the spring 68, which can be controlled by the position of the retainer 66 so as to provide a predetermined amount of pressure on the drive plates 62, 63 and friction member 64. As shown, the retainer 66 is preferably a ring that locks the spring 68 and friction clutch mechanism 60 into the end cap 42. Clutch packs are well known, see for example U.S. Pat. No. 3,935,754, incorporated herein by reference in its entirety.

An issue that can develop with an overrunning clutch such as in the present invention, is in electric vehicles which use regenerative breaking, as the vehicle decelerates As the electric motor pulses during regenerative breaking, it causes the overrunning clutch to move back and forth between the forward cam surfaces 82a and reverse cam surfaces 82b. This produces shaking in the clutch and drive system. The clutch packs 60 are designed to prevent or reduce the shaking so that the cage can keep the rollers in contact with the forward (or reverse) cam surfaces. This prevents shaking from occurring. Similar pulsing can be experienced on gas and diesel utility vehicles that have engine breaking ability incorporated into the drive system.

As discussed in U.S. Pat. No. 6,722,484, which is incorporated herein by reference in its entirety, the roll cage assembly 30 in the overrunning clutch 10 must be indexed relative to the clutch housing 12 in order to permit wedging to occur. That is, the rollers 36 must be moved to a position relative to the cam surfaces 82 that permits the rollers 36 to wedge. To achieve this, the roll cage 32 is engaged (frictionally) to the hubs so that relative movement between the clutch housing 12 and the hubs 20 will cause the roll cage 32 to index relative to the housing 12. To index the roll cage 32, the clutch 10 includes a friction disk mechanisms 50, shown in detail in FIG. 2A, on either side of the roll cage assembly 30. A first friction disk mechanism 50 is in contact with the roll cage 32 and one of the hubs 20, and a second friction disk mechanism 50 is in contact with the roll cage 32 and the other of the hubs 20. The friction disk mechanisms 50 urge the roll cage assembly 30 to rotate with the hubs 20, when the hubs are rotating, or to remain stationary with the hubs 20 when the hubs 20 are stationary.

In particular, when a wheeled vehicle is stationary such that the hubs 20 are stationary, and rotational movement is applied to the housing 12 via an external drive mechanism, the housing 12 begins to rotate with respect to the hubs 20. The friction disk mechanisms 50 prevent the roll cage assembly 30 from rotating with respect to the hubs 20, which holds the roll cage 32 in position, thus indexing the rollers 36 into position so that they can wedge into engagement between the forward cam surfaces 82 and the hub 20. Once the rollers 36 are wedgingly engaged, the housing 12, the roller cage 32, and the hubs 20 all rotate together, and the rollers 36 remain non-rotating about their own axes. During overrunning of one hub 20, the overrunning side of the roll cage 32, the rollers 36 will overrun in the direction that the clutch housing is driving, this happens when the overrunning hub 20 rotates faster than the housing 12. The non-overrunning hub 20 will continue to be driven at the same rotational speed as the housing 12. During overrunning, the rollers 36 corresponding to the overrunning hub 20 rotate about their own axes.

During the input/output changes of the hubs 20, such as during descent down a slope or when the vehicle is placed into neutral while moving, the friction produced by both friction disk mechanisms 50 is sufficient to continue to frictionally engage the roll cage 32 and the overrunning hubs 20 so that the cage indexes relative to the housing 12, thus causing the rollers 36 to move out of their wedging engagement with the forward cam surface 82a and into engagement with the reverse cam surface 82b. As such, the speed of the hubs 20 now transmits torque to the housing 12, thus providing back-driving of the drive system.

Each friction disk mechanism 50 includes a roll cage plate 52 attached to each side of the roll cage 32 so that it rotates with the roll cage 32. The roll cage plate 52 can be permanently or removably attached to the roll cage 32 or may simply be formed as a portion of the cage 32. The friction disk mechanism 50 also includes an inner hub friction member or plate 54 attached to the hub 20 so as to rotate with the hub 20 while being free to move axially with respect to the hub 20. For example, the inner hub friction member 54 can be connected by a splined connection to the hub 20. A slip disk 56 is positioned about that hub 20 and provides a stop surface as will be discussed in more detail below. The slip disk 56 is in contact with either the hub 20 or the housing 12. In the illustrated configuration, the slip disk 56 is a ring that is engaged to the hub 20. More particularly, the slip disk 56 contacts a portion of the end cap assembly 60. As shown, the slip disk 56 includes a circumferential rim that contacts the spring 68 and an inner annular portion that contacts the drive plate 62 of the end cap assembly 60.

A spring 58 is compressed between the slip disk 56 and the inner hub friction member 54. In the depicted embodiment, the spring 58 is a wave spring although other springs can be used in the present invention. The spring 58 urges the inner hub friction member 54 into frictional contact with the roll cage plate 52. To inhibit or prevent torsional forces from being imposed on the spring 58 by the slip disk 56, which can cause unwinding of the spring 58, the slip disk 56 preferably includes at least one surface with a low coefficient of friction (low friction surface) 59 which is in contact with one end or portion of the spring 58. The slip disk is intended to reduce or eliminate torsional loading on the spring 58, thus reducing wear on the end cap assembly. Preferably the low friction surface 59 of the slip disk 56 provides sufficient lubricity and strength so as to prevent galling or wear of the end cap assembly. In one embodiment, the low friction surface 59 is in contact with spring 58 of the friction disk assembly 50, such that if there is relative movement between the slip disk 56 and the spring 58, the slip disk 56 would impose only minimal torsional loading on the spring 58. In another embodiment, the low friction surface 59 is in contact with a portion of the end cap assembly 40 (such as the drive plate 62) to substantially prevent the slip disk 56 from rotating relative to the spring 58. In another embodiment, the low friction surface 59 is on both sides of the slip disk 56 and is in contact with both the spring 58 and a portion of the end cap assembly 40. In one version of the invention, the slip disk is made from a high strength material with a low coefficient of friction, such as Teflon® material (polytetrafluoroethylene), or Delrin® acetal resin material, both of which are available from the DuPont Company. Delrin resin has a static coefficient of friction of between about 0.15μ and 0.40μ. In its broadest sense, the slip disk 56 permits substantially unrestricted rotation of the spring 58 relative to the end cap assembly 40.

While the invention has been disclosed with reference to certain preferred embodiments, numerous modifications, alterations, and changes to the described embodiments are possible without departing from the sphere and scope of the invention, as defined in the appended claims and equivalents thereof. Accordingly, it is intended that the invention not be limited to the described embodiments, but that it have the full scope defined by the language of the following claims.

What is claimed is:

1. A bi-directional overrunning clutch for driving two shafts of an axle, the clutch comprising:

a housing adapted to be engaged with and rotated by a drive mechanism, the housing including an inner cam surface;

a pair of hubs substantially coaxially aligned with each other within the housing including a first hub adapted to engage an end of a first shaft of a drive axle and a second hub adapted to engage an end of a second shaft of the drive axle;

a roller assembly including a roll cage having a first set of slots located about one hub and a second set of slots located about the other hub, and a set of rollers located in each set of slots between the corresponding hub and the inner cam surface of the housing, the set of rollers surrounding each hub being adapted to wedgingly engage between the hub and the inner cam surface for transmitting torque therebetween;

a pair of end cap assemblies attached at each end of the housing so as to rotate with the housing, including a first end cap adjacent to the first hub and a second end cap adjacent to the second hub; and a pair of friction disk mechanisms including a first friction disk mechanism in contact with the roll cage and the first hub and a second friction disk mechanism in contact with the roll cage and the second hub, the friction disk mechanisms being adapted to cause the roll cage to rotate with one or both of the hubs, each friction disk mechanism including a roll cage plate attached to or formed on the roll cage so as to rotate with the roll cage, an inner hub friction member attached to the hub so as to rotate with the hub, a slip disk contacting a portion of the end cap assembly, and a spring compressed between the slip disk and the inner hub friction member biasing the inner hub friction member into frictional contact with the roll cage plate;

wherein the slip disk includes a surface with a coefficient of friction configured to reduce torsional loading on the spring;

and wherein the inner cam surface has a forward cam surface and a reverse cam surface, such that when the housing is rotating faster than the hub, the rollers wedgingly engage between the forward cam surface and the hub, and when the hubs are both rotating faster than the housing, the rollers wedgingly engage between the reverse cam surface and the hub.

2. The overrunning clutch of claim 1, wherein the spring is a wave spring.

3. The overrunning clutch of claim 1, wherein the inner hub friction member is attached to the hub by a splined connection.

4. The overrunning clutch of claim 1, wherein the surface of the slip disk with the coefficient of friction configured to reduce torsional loading is in contact with a portion of the spring.

5. The overrunning clutch of claim 1, wherein the surface of the slip disk with the coefficient of friction configured to reduce torsional loading is in contact with the portion of the end cap assembly.

6. The overrunning clutch of claim 1, wherein the surface of the slip disk with the coefficient of friction configured to reduce torsional loading is in contact with both a portion of the spring and the portion of the end cap assembly.

7. The overrunning clutch of claim 1, wherein each end cap assembly comprises an end cap attached to the housing and a friction clutch mechanism including at least one drive plate attached to the end cap so as to rotate with the end cap, an outer hub friction member attached to the hub so as to rotate with the hub, a retainer attached to the end cap in an axially fixed position, and a spring compressed between the retainer and the at least one drive plate, the spring biasing one of either the at least one drive plate and the outer hub friction member into frictional contact with the other of the at least one drive plate and the outer hub friction member;

wherein the friction clutch mechanism is adapted to urge the housing to rotate with one or both of the hubs when one or both of the hubs is rotating faster than the housing so as to dampen the wedging engagement of the rollers between the hub and the reverse cam surface.

8. The overrunning clutch of claim 7, wherein the at least one drive plate includes a pair of drive plates, one on either side of the outer hub friction member.

9. The overrunning clutch of claim 7, wherein the outer hub friction member is attached to the hub by a splined connection.

10. The overrunning clutch of claim 7, wherein the at least one drive plate includes at least one tab that engages with a notch in the end cap for attaching the drive plate to the end cap.

11. A bi-directional overrunning clutch for driving two shafts of an axle, the clutch comprising:

a housing adapted to be engaged with and rotated by a drive mechanism, the housing including an inner cam surface;

a first hub and a second hub substantially coaxially aligned with each other within the housing;

a roll cage having a first set of slots positioning a set of rollers in an annular space between the first hub and the inner cam surface of the housing and a second set of slots positioning a set of rollers in an annular space between the second hub and the inner cam surface of the housing, the rollers surrounding each hub being adapted to wedgingly engage between the hub and the inner cam for transmitting torque therebetween;

a first end cap attached to the housing adjacent to the first hub and a second end cap attached to the housing adjacent to the second hub; and a friction disk mechanism located on each side of the roll cage including a roll cage plate attached to the roll cage so as to rotate with the roll cage, an inner hub friction member attached to the hub so as to rotate with the hub, a slip disk, and a spring compressed between the slip disk and the inner hub friction member biasing the inner hub friction member into frictional contact with the roll cage plate, the friction disk mechanisms being adapted to cause the roll cage to rotate with one or both of the hubs, the slip disk including a surface with a coefficient of friction configured to reduce torsional loading on the spring.

12. The overrunning clutch of claim 11, wherein each end cap comprising a pair of drive plates attached to the end cap so as to rotate with the end cap, an outer hub friction member positioned axially between the drive plates and attached to the hub so as to rotate with the hub, a retainer attached to the end cap in an axially fixed position, and a spring compressed between the retainer and one of the drive plates urging the drive plates into frictional contact with the outer hub friction member.

13. The overrunning clutch of claim 12, wherein the outer hub friction member is attached to the hub by a splined connection.

14. The overrunning clutch of claim 12, wherein each drive plate includes at least one tab that engages with a notch in the end cap for attaching the drive plate to the end cap.

15. The overrunning clutch of claim 11, wherein the spring is a wave spring.

16. A bi-directional overrunning clutch including: a housing adapted to be engaged with and rotated by a drive mechanism, the housing having an inner cam surface; a first hub and a second hub substantially coaxially aligned with each other within the housing; a roll cage having a first set of slots positioning a set of rollers in an annular space between the first hub and the inner cam surface of the housing and a second set of slots positioning a set of rollers in an annular space between the second hub and the inner cam surface of the housing, the rollers surrounding each hub being adapted to wedgingly engage between the hub and the inner cam surface when one of the hub and the housing is rotated with respect to the other of the hub and the housing; and a first end cap attached to the housing adjacent to the first hub and a second end cap attached to the housing adjacent to the second hub, a friction disk mechanism located on each side of the roll cage, the friction mechanism comprising:

a roll cage plate attached to the roll cage so as to rotate with the roll cage;

an inner hub friction member attached to the hub so as to rotate with the hub;

a slip disk; and a spring compressed between the slip disk and the inner hub friction member biasing the inner hub friction member into frictional contact with the roll cage plate, the friction disk mechanisms being adapted to cause the roll cage to rotate with one or both of the hubs;

wherein the slip disk has a surface with a coefficient of friction configured to reduce torsional loading on the spring.

17. The friction disk mechanism of claim 16, further comprising:
- a pair of drive plates attached to each end cap so as to rotate with the end cap;
- an outer hub friction member positioned axially between the drive plates and attached to the hub so as to rotate with the hub;
- a retainer attached to the end cap in an axially fixed position; and
- a spring compressed between the retainer and one of the drive plates biasing the drive plates into frictional contact with the outer hub friction member;
- wherein the friction clutch mechanism is adapted to urge the housing to rotate with one or both of the hubs when one or both of the hubs is rotating faster than the housing so as to dampen the wedging engagement of the rollers between the hub and the reverse cam surface.

* * * * *